(12) United States Patent
Sonntag

(10) Patent No.: US 10,498,880 B2
(45) Date of Patent: Dec. 3, 2019

(54) MOBILE COMMUNICATION DEVICE WITH A PLURALITY OF APPLICATIONS ACTIVATABLE VIA A PIN

(71) Applicant: Deutsche Telekom AG, Bonn (DE)

(72) Inventor: Thomas Sonntag, Wachtberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/098,167

(22) PCT Filed: Jul. 28, 2017

(86) PCT No.: PCT/EP2017/069112
§ 371 (c)(1),
(2) Date: Nov. 1, 2018

(87) PCT Pub. No.: WO2018/019978
PCT Pub. Date: Feb. 1, 2018

(65) Prior Publication Data
US 2019/0158653 A1    May 23, 2019

(30) Foreign Application Priority Data

Jul. 29, 2016    (EP) .................................... 16182111

(51) Int. Cl.
*H04W 8/18*    (2009.01)
*H04M 1/725*    (2006.01)
(Continued)

(52) U.S. Cl.
CPC ...... *H04M 1/72577* (2013.01); *G06F 21/121* (2013.01); *G06F 21/31* (2013.01);
(Continued)

(58) Field of Classification Search
None
See application file for complete search history.

(56) References Cited

U.S. PATENT DOCUMENTS

2015/0007348 A1*    1/2015    Holtmanns ........... H04W 12/06
726/28

FOREIGN PATENT DOCUMENTS

| EP | 2063378 A2 | 5/2009 |
| EP | 2802116 A1 | 11/2014 |

OTHER PUBLICATIONS

Elaheh Vahidian: "Evolution of the SIM to eSIM", Jan. 21, 2013 (Jan. 1, 2013), XP055249025.
(Continued)

*Primary Examiner* — Suhail Khan
(74) *Attorney, Agent, or Firm* — Leydig, Voit & Mayer, Ltd.

(57) ABSTRACT

A mobile communication device executes a plurality of applications. Each application of the plurality of applications is configured to be activated via a respective application identification number. The mobile communication device comprises: a subscriber identity module, which is assigned a personal identification number; a user interface for receiving a user input of the personal identification number of the subscriber identity module; and a processor, configured to automatically activate at least one application of the plurality of applications via the at least one respective application identification number assigned to the at least one application in response to the user input of the personal identification number.

12 Claims, 7 Drawing Sheets

(51) Int. Cl.

| | | |
|---|---|---|
| *H04M 1/673* | (2006.01) | |
| *G06F 21/12* | (2013.01) | |
| *G06F 21/62* | (2013.01) | |
| *G06F 21/31* | (2013.01) | |
| *H04L 29/06* | (2006.01) | |
| *H04W 12/06* | (2009.01) | |
| *H04W 4/70* | (2018.01) | |
| *H04B 1/3816* | (2015.01) | |
| *H04W 88/02* | (2009.01) | |

(52) U.S. Cl.
CPC ......... *G06F 21/629* (2013.01); *H04B 1/3816* (2013.01); *H04L 63/083* (2013.01); *H04L 63/0853* (2013.01); *H04M 1/673* (2013.01); *H04M 1/72522* (2013.01); *H04W 4/70* (2018.02); *H04W 12/0608* (2019.01); *H04W 12/06* (2013.01); *H04W 88/02* (2013.01)

(56) References Cited

OTHER PUBLICATIONS

Simalliance: "eUICC Profile Package: Interoperable Format Technical Specification—Version 1.0", Jun. 25, 2015 (Jun. 25, 2015), XP055322173.
5g Ppp Architecture Working Group: "View on 5G Architecture—Version 1.0", Jul. 1, 2016 (Jul. 1, 2016), XP055322873.

\* cited by examiner

MOBILE COMMUNICATION DEVICE WITH A PLURALITY OF APPLICATIONS ACTIVATABLE VIA A PIN

CROSS-REFERENCE TO RELATED APPLICATIONS

This application is a U.S. National Phase application under 35 U.S.C. § 371 of International Application No. PCT/EP2017/069112, filed on Jul. 28, 2017, and claims benefit to European Patent Application No. EP 16182111.1, filed on Jul. 29, 2016. The International Application was published in German on Feb. 1, 2018 as WO 2018/019978 A1 under PCT Article 21(2).

FIELD

The present invention relates to a mobile communication device having a Subscriber Identity Module (SIM) module on which a plurality of applications can be executed which are automatically activated via a PIN (personal identification number) as well as method for activating at least one application on a mobile communication device via a PIN. The invention in particular relates to a mobile communication device which can establish a communication channel over a 5G network via the input of a PIN.

BACKGROUND

As telecommunication (TK) services and applications increase, the number of PINS needing to be remembered and managed grows. In the 5G environment, this problem is further intensified because of additional slice-based services to be added.

In the context of the IoT ("Internet of Things"), a large number of communication devices, sensors, MTC ("Machine Type Communication") devices, etc. are used in the field, each drawing on different services or applications. The maintenance or the servicing and maintaining respectively of the PINS for these devices thus becomes a complex problem.

SUMMARY

In an exemplary embodiment, the present invention provides a mobile communication device for executing a plurality of applications. Each application of the plurality of applications is configured to be activated via a respective application identification number. The mobile communication device comprises: a subscriber identity module, which is assigned a personal identification number; a user interface for receiving a user input of the personal identification number of the subscriber identity module; and a processor, configured to automatically activate at least one application of the plurality of applications via the at least one respective application identification number assigned to the at least one application in response to the user input of the personal identification number.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
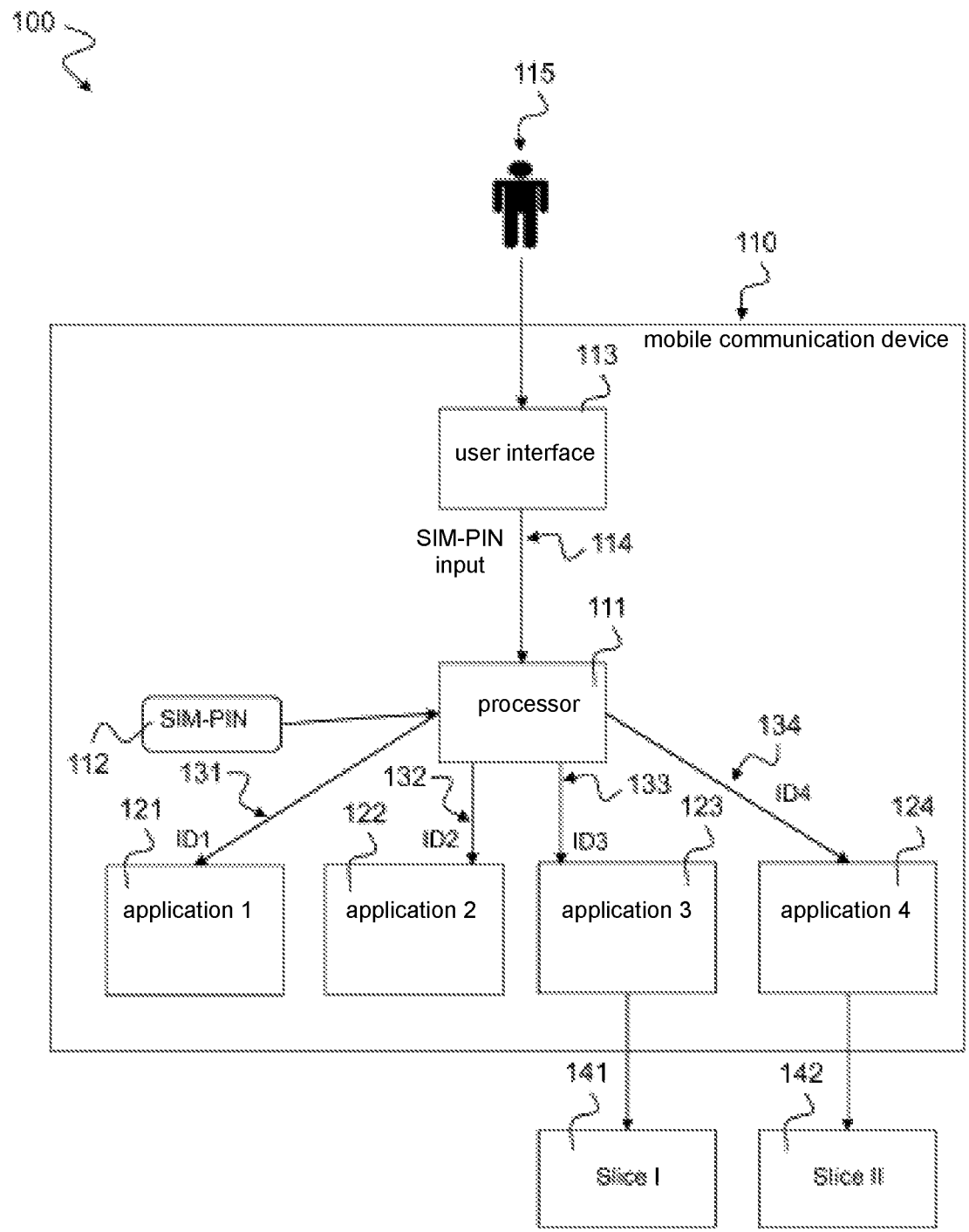
FIG. 1 is a schematic representation of a communication system 100 comprising a mobile communication device 110 on which a plurality of applications can be activated via PIN input via a user interface 113 according to a first exemplary embodiment.

Exemplary embodiments of the present invention provide for managing a large number of mobile communication devices, sensors and MTC devices, each drawing on different services or applications in the field.

In an exemplary embodiment, the present invention provides for managing mobile communication devices with respect to the aforesaid requirements in 5G networks.

In an exemplary embodiment, a SIM-PIN is used as a master PIN for activating all the services and applications. The use of the SIM-PIN improves security as SIMs are usually implemented as hardware security modules—both the traditional plastic SIMs as well as eSIMs in the form of eUICCs. Furthermore, a SIM is able to securely manage the slave SIMs in hardware instead of same being stored in a non-secure device memory.

The methods and systems presented in the following can be of different types. The individually described elements can be implemented as hardware or software components, for example electronic components, which can be manufactured by different technologies and incorporate e.g. semiconductor chips, ASICs, microprocessors, digital signal processors, integrated electrical circuits, electro-optical circuits and/or passive components.

The devices, systems and methods presented in the following are suitable for transmitting information over a communication network. The term communication network or communication net thereby refers to the technical infrastructure via which the signal transmission takes place. The communication network may include the carrier network, in which the signals are transmitted and communicated between the stationary devices and platforms of the mobile communication network or fixed network, as well as the access network in which the signals are transmitted between a network access device and the communication terminal. The communication network can thereby comprise both components of a mobile communication network as well as components of a fixed network. In the mobile communication network, the access network is also referred to as the air interface and comprises for example a base station (NodeB, eNodeB, radio cells) with cellular antennas in order to establish communication with a communication terminal such as e.g. a mobile telephone or respectively smartphone or a mobile device having a mobile radio adapter. In a fixed network, the access network comprises for example a DSLAM (digital subscriber line access multiplexer) in order to wire or wirelessly connect the communication terminals of multiple subscribers. The switching net can forward the communication into further networks, for example other network operators, e.g. international networks.

The devices, systems and methods presented in the following are provided for increasing communication in communication networks, particularly in communication networks subject to the 5G system architecture as presented in the following.

According to a first aspect, the invention relates to a mobile communication device on which a plurality of applications can be executed, whereby each application can be activated by an application identification number, wherein the communication device has a subscriber identity module (SIM) which is assigned a personal identification number (PIN), comprising: a user interface for entering an input of the personal identification number of the subscriber identity module; and a processor configured to automatically activate at least one application of the plurality of applications via the application identification number assigned to the at least one application in response to the entered input of the personal identification number so as to execute the at least one application.

This provides the advantage of all the applications and services on the mobile communication device being able to be activated by the input of a single personal identification number, and that being the one associated with the SIM module. This thereby enables a large number of field-used mobile communication devices, sensors and MTC devices to be efficiently managed since the user no longer needs to remember a separate application ID for each application on a device but this instead being able to be implemented centrally via the SIM-PIN of the SIM module. This is in particular advantageous in the context of 5G communication networks as they use a very large number of services and applications which can be activated by a single SIM-PIN.

According to one embodiment of the mobile communication device, the processor is configured to automatically activate any application of the plurality of applications via the application identification number assigned to each respective application in response to the entered input of the personal identification number.

This provides the advantage of enabling fast and effective activation of a large number of applications and services.

According to one embodiment of the mobile communication device, the processor is configured to transmit the respective application identification number to the respective application in order to activate said respective application.

This provides the advantage of the individual applications being able to be activated from a central location; i.e. by the processor, and thus in coordinated and planned manner.

According to one embodiment of the mobile communication device, the processor is configured to launch the plurality of applications and activate the launched applications via the personal identification number.

This provides the advantage of the processor having an overview of the individual applications as the central instance and being able to activate them according to their time-related requirements and resource usage.

According to one embodiment, the mobile communication device comprises a memory in which the application identification numbers of the plurality of applications are stored and the processor is configured to read out the application identification numbers from the memory for the activation of the applications.

This provides the advantage of the individual application identification numbers not needing to be stored on the SIM module but rather being able to be stored in a dedicated area of the memory. This may be a secure area so as to ensure the appropriate security against unauthorized access.

According to one embodiment of the mobile communication device, each application of the plurality of applications has its own secondary PIN via which it can be activated, and the personal identification number is a master PIN able to activate all the secondary PINs.

This provides the advantage of all the secondary PINs being able to be easily and efficiently activated via the master PIN.

According to one embodiment of the mobile communication device, the processor is configured to activate the at least one application in response to the entered PIN matching the PIN assigned to the subscriber identity module.

This provides the advantage of being able to verify whether an authorized user entered the PIN. No application is activated for a non-authorized user who does not enter the correct PIN; i.e. the PIN associated with the subscriber identity module.

According to one embodiment, the mobile communication device comprises a management interface which is configured to receive the PIN assigned to the subscriber identity module from a network operator, in particular via an SMDP (Subscription Manager Data Preparation) server.

This provides the advantage of the mobile communication device being able to easily change mobile network operator. A new SIM card no longer needs to be purchased and installed because it becomes possible to easily request a new PIN for a new network operator via the management interface, for example via download from an SMDP server. The mobile communication device can thus be implemented with a built-in SIM card, e.g. an electronic SIM or eUICC module.

According to one embodiment of the mobile communication device, the management interface comprises hardware circuitry configured to store the received PIN associated with the subscriber identity module in an encrypted area of the mobile communication device bypassing the processor.

This increases security against unauthorized sniffing out or intercepting of the PIN transmitted over the management interface because any malware potentially infecting the processor, e.g. because it has an operating system, can no longer access the physical link for transmitting the PIN.

According to one embodiment of the mobile communication device, the plurality of applications comprise the following: application programs, services, configurations, access to storage media, access to servers, access to communication devices, network access control applications, in particular USIM (UMTS SIM, Universal Mobile Telecommunications System Subscriber Identity Module), CSIM (CDMA SIM, Code Division Multiple Access Subscriber Identity Module), ISIM (IMS SIM, IP Multimedia Service Identity Module); NFC ("Near Field Communication") applications.

This provides the advantage of being able to centrally control and manage a plurality of different applications for different network access technologies.

According to one embodiment, the mobile communication device comprises an eUICC (embedded Universal Integrated Circuit Card or electronic Universal Integrated Circuit Card) circuit on which the subscriber identity module (SIM) is implemented.

This provides the advantage of the SIM module being permanently embedded in the mobile communication device and thereby being able to dispense with mechanical slots for the inserting of the SIM card and interfaces for coupling the SIM card to the mobile communication device. The resulting space can be used more efficiently, for example by constructing a smaller smartphone which uses less energy since no power needs to be supplied to the omitted components.

According to one embodiment of the mobile communication device, the processor is configured to establish a communication channel over a fifth-generation (5G) or further generation network in response to the entered input of the personal identification number.

This provides the advantage of being able to activate the mobile communication device so as to establish a communication channel over a 5G communication network by input of the PIN number. The mobile communication device is thereby very flexible in its use without needing to change the SIM module or the subscriber identity module respectively.

According to one embodiment of the mobile communication device, the processor is configured to configure or allow configuration of a slice of the fifth or further generation network in response to the entered input of the personal identification number. The processor can perform the configuration itself or have it executed by a management entity in the 5G network.

This provides the advantage of individual subnets or slices of the 5G network being able to be configured by PIN input. In other words, the user does not need to remember various passwords in order to be able to activate the required resources and applications of the 5G network. He simply needs to remember the SIM-PIN number in order to thereby be able to access all the communication resources, services and applications of the 5G net.

According to one embodiment of the mobile communication device, the processor is configured to activate or allow activation of an application of the fifth or further generation network in response to the entered input of the personal identification number. The processor can perform the activation itself or have it executed by a management entity in the 5G network.

This provides the advantage of a single PIN being able to activate all the necessary applications and services of the 5G network, which noticeably improves the simplicity of communication in the 5G network along with user-friendliness.

According to a second aspect, the invention relates to a method for activating at least one application on a mobile communication device on which a plurality of applications can be executed, whereby each application can be activated by an application identification number, whereby the communication device has a subscriber identity module (SIM) which is assigned a personal identification number (PIN), comprising: entering an input of the personal identification number of the subscriber identity module; and automatically activating at least one application of the plurality of applications via the application identification number assigned to the at least one application in response to the entered input of the personal identification number so as to execute the at least one application.

A method of this type provides the advantage of all the applications and services on the mobile communication device being able to be activated by the input of a single personal identification number, and that being the one associated with the SIM module. This thereby enables a large number of field-used mobile communication devices, sensors and MTC devices to be efficiently managed since the user no longer needs to remember a separate application ID for each application on a device but this instead being able to be implemented centrally via the SIM-PIN of the SIM module. This is in particular advantageous in the context of 5G communication networks as they use a very large number of services and applications which can be activated by a single SIM-PIN.

The following detailed description will reference the accompanying drawings which form a part hereof and in which specific embodiments in which the invention can be implemented are illustratively shown. It is understood that other embodiments can also be used and structural or logical changes made without deviating from the concept of the present invention. The following detailed description is therefore not to be understood in a limiting sense. It is furthermore understood that unless otherwise specified, the features of the different example embodiments described herein can be combined with one another.

The aspects and embodiments are described with reference to the drawings, whereby like reference numerals generally refer to the same elements. Numerous specific details are set forth in the following description for explanatory purposes in order to impart an in-depth understanding of one or more aspects of the invention. Implementation of one or more aspects or embodiments having a lesser extent of specific details may, however, be apparent to a person skilled in the art. In other cases, known structures and elements are depicted in schematic form in order to facilitate the describing of one or more aspects or embodiments. It is understood that other embodiments may be utilized and structural or logical changes made without departing from the concept of the present invention.

While a specific feature or a specific aspect of an embodiment may have been disclosed with respect to only one of several implementations, such a feature or such an aspect can additionally be combined with one or more other features or aspects of other implementations, as can be desired and advantageous for a given or specific application. Furthermore, to the extent that the terms "contain," "have" "with" or other variants thereof are used in either the detailed description or the claims, such terms are intended to be inclusive in a manner similar to the term "comprise." The terms "coupled" and "connected" may be used together with derivatives thereof. It is understood that such terms may be used in order to indicate that two elements cooperate or interact irrespective of whether they are in direct physical or electrical contact or not in direct contact with each other. In addition, the term "exemplary" is only to be construed as an example rather than an indication of the best or optimum. The following detailed description is therefore not to be understood in a limiting sense.

FIG. 1 shows a schematic representation of a communication system 100 comprising a mobile communication device 110 on which a plurality of applications can be activated via PIN input via a user interface 113 according to a first exemplary embodiment.

A plurality of applications 121, 122, 123, 124 are implemented on the mobile communication device 110. Each application can be activated via an application identification number ID1 131, ID2 132, ID3 133, ID4 134. The communication device 110 comprises a subscriber identity module (SIM) 112 which is assigned a personal identification number SIM-PIN. The mobile communication device 110 comprises a user interface 113 for entering an input of the personal identification number 114 of the subscriber identity module 112. A user of the mobile communication device 110 can effect an input of the SIM-PIN 114 via the user interface 113. The user interface 113 can for example be a keyboard for entering inputs of the user 115 or a microphone for recording acoustic commands of the user 115 or an optical sensor for scanning optical instructions of the user 115. The mobile communication device 110 further comprises a processor 111 which is configured to automatically activate at least one application of the plurality of applications 121, 122, 123, 124 via the application identification number 131, 132, 133, 134 assigned to the at least one application in response to the entered input of the personal identification number 114 in order to execute the at least one application. In this context, automatically means that no further interaction of the user 115 is then required.

The subscriber identity module 112 or respectively SIM module or SIM card forms an integrated circuit which securely stores the IMSI ("International Mobile Subscriber Identity") and the associated key information. The key information is used to identify and authenticate the user of the mobile communication device. The key information stored in the subscriber identity module 112 can comprise the following: a unique serial number (ICCID, Integrated Circuit Card ID) of up to 20 characters, the IMSI with MCC (Mobile Country Code), MNC (Mobile Network Code) and MSIN (Mobile Subscriber Identification Number), security-related authentication and encryption information such as, for example, the authentication key, e.g. in the form of a 128-bit unique key for each SIM, which can also be stored on the authentication server (AuC) or the HSS (Home Subscription Server) respectively, temporary information related to the local network, for example LAI (Local Area ID) as transmitted by the local carrier, and a list of services and applications to which the user has access, for example an operator-specific emergency number, the number of the SMS (Short Message Service) server, the name of the service provider (SPN, Service Provider Name), service call numbers (SDN, Service Dialing Numbers), cost profile parameters, additional services (VAS, Value Added Services).

Furthermore, two passwords can be stored on the subscriber identity module 112, or the SIM module or SIM card respectively, one being the PIN which is intended for normal use, also referred to here as the SIM-PIN, and one being a personal unlock code (PUK, Personal Unblocking Code) for unlocking the PIN/SIM-PIN.

The applications can be application programs, so-called apps, or services on the mobile communication device 110 or respectively smartphone. The applications can also be coupled with slices 141, 142 of a 5G communication network in order to enable or activate specific functions there as will be described in greater detail below relative to FIGS. 4 to 6.

The processor 111 can thereby automatically activate any application of the plurality of applications 121, 122, 123, 124 via the application identification number 131, 132, 133, 134 in response to the entered input of the personal identification number 114. The processor 111 can to that end transmit the respective application identification number to the respective application 121, 122, 123, 124 in order to activate said respective application.

The processor 111 can thereafter launch the plurality of applications 121, 122, 123, 124 and activate the launched applications 121, 122, 123, 124 via the personal identification number.

Each application of the plurality of applications 121, 122, 123, 124 can have its own secondary PIN via which it can be activated. The personal identification number can thereby be a master PIN with which all the secondary PINS can be activated.

The plurality of applications 121, 122, 123, 124 can comprise, for example, application programs, services, configurations, access to storage media, access to servers, access to communication devices, network access control applications, particularly USIM, CSIM, ISIM, NFC applications.

The subscriber identity module 112 can be implemented on, for example, an eUICC (embedded Universal Integrated Circuit Card) circuit.

In one embodiment, the processor 111 can establish a communication channel 615 over a fifth-generation network (5G) 400, 500 or further generation network in response to the entered input of the personal identification number 114, as described in greater detail below in an example referencing FIGS. 4, 5 and 6.

The processor 111 can, for example, configure a slice 601 of the fifth-generation network 400, 500 or further generation network in response to the entered input of the personal identification number 114, as described in greater detail below in an example referencing FIGS. 4, 5 and 6. The processor 111 can, for example, activate an application 403 of the fifth-generation network 400, 500 or further generation network in response to the entered input of the personal identification number 114, as described in greater detail below in an example referencing FIGS. 4, 5 and 6.

All the applications and services 121, 122, 123, 124 can be unlocked by the inputting of the SIM PIN 114.

According to one embodiment, the unlocking process is triggered by the processor 111. When an application 121, 122, 123, 124 is called up, it is activated via the processor 111 via the transmission of the IDs 131, 132, 133, 134. The processor 111 handles the management of the IDs 131, 132, 133, 134.

Unlocking the SIM thus automatically also unlocks all the services 121, 122, 123, 124 associated with the SIM or respectively eSIM 112. A service can even be, for example, the unlocking of the device 110 itself.

Moreover, 5G services can hereby also be activated: If access to a slice 141, 142 is ID-protected, the slice can thus be automatically unlocked. In addition to the IDs, passwords can also be managed. This has the advantage of passwords not needing to be stored in a browser cache, which can be of advantage in e.g. an online banking application.

After the SIM 112 has been locked, the services and applications 121, 122, 123, 124 can be automatically deactivated. This thereby also increases the security of the services and applications 121, 122, 123, 124 as well as the protection against unauthorized access.

The services and applications 121, 122, 123, 124 can additionally be selectively and SIM-based activated.

Figure 2:
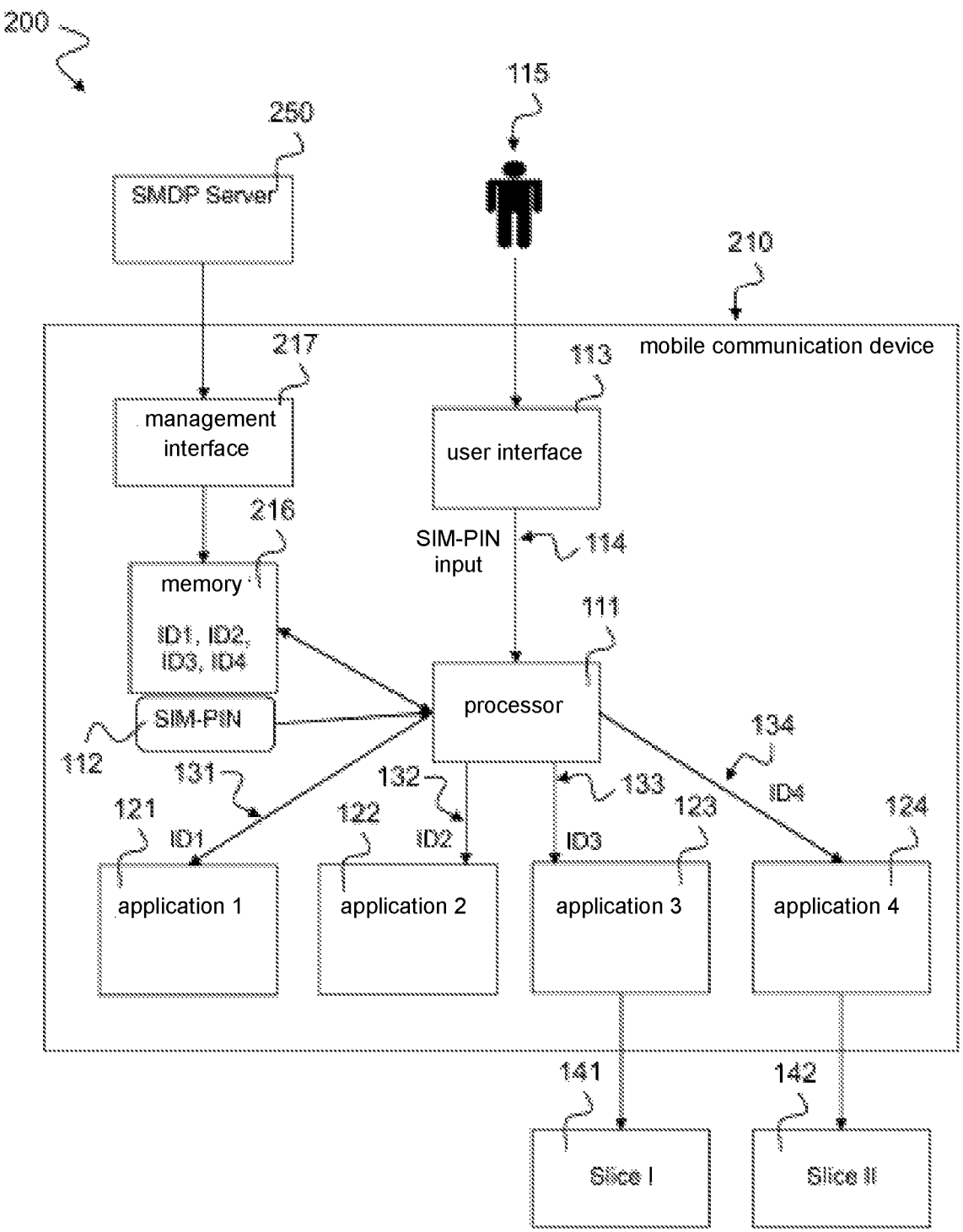
FIG. 2 is a schematic representation of a communication system 200 comprising a mobile communication device 210 on which a plurality of applications can be activated via PIN input via a user interface 113 and a management interface 217 for receiving a user profile in accordance with a second exemplary embodiment.

FIG. 2 shows a schematic representation of a communication system 200 comprising a mobile communication device 210 on which a plurality of applications can be activated via PIN input via a user interface 113 and a management interface 217 for receiving a user profile in accordance with a second exemplary embodiment.

The mobile communication device 210 corresponds to the previously described mobile communication device 110 in FIG. 1, whereby mobile communication device 210 further comprises a management interface 217 for receiving or respectively downloading a user profile from an SNDP server 250 as well as a memory 216 for storing the individual application identification numbers 131, 132, 133, 134. The processor 111 can thereby read out the application identification numbers 131, 132, 133, 134 for activating the applications 121, 122, 123, 124 from the memory 216.

The management interface 217 thereby serves in receiving the PIN associated with the subscriber identity module 112 from a network operator, for example via an SMDP (Subscription Manager Data Preparation) server 250. The SMDP server 250 can for example be implemented as per the SMDP server 320 depicted in FIG. 3.

In one embodiment, the management interface 217 comprises hardware circuitry via which the received PIN associated with the subscriber identity module can be stored in an encrypted area of the mobile communication device 210 bypassing the processor 111. This encrypted area can be located on the SIM module 112 and/or can be a part of the memory 216. The aforesaid hardware circuitry can, for example, be wiring which stores the PIN received from the SMDP server directly in the memory 216 or respectively to the SIM module 112.

For example, a DMA ("Direct Memory Access") controller can be used to that end which provides direct memory access to the memory 216 or SIM module 112 without needing to use the processor 111 for the purpose. Security against interception of the transmitted PIN can thereby be increased because viruses or trojans need the operating system of the processor 111 in order to be able to infiltrate the mobile communication device. The PIN can no longer be maliciously captured when it is passed on without using an operating system.

In an alternative embodiment, the above-described hardware circuitry can be implemented as an NFC ("Near Field Communication") interface between the management interface 217 and the memory 216 or SIM module 112. In such an implementation, the link between the management interface 217 and the memory 216 is implemented via near field radio communication which likewise does not need to use the operating system of the processor 111. As previously described above, viruses or trojans need the operating system of the processor 111 in order to be able to infiltrate the mobile communication device 210. This link can thereby be implemented in intercept-proof manner because the hop between both components 217, 216 only extends within a range of a few centimeters.

In a further alternative embodiment, the above-described hardware circuitry can be implemented as an optical interface, e.g. by light-emitting diodes (LEDs) or laser diodes and photo-sensors between the management interface 217 and the memory 216 or respectively SIM module 112. In such an implementation, the link between the management interface 217 and the memory 216 is implemented via optical communication which likewise does not need to make use of the operating system of the processor 111. As previously described above, viruses or trojans require the operating system of the processor 111 in order to be able to infiltrate the mobile communication device 210. This link can thereby be implemented in intercept-proof manner because the optical field between the two components 217, 216 only extends between said two components; i.e. only internally in the mobile communication device 210.

The plurality of applications 121, 122, 123, 124 can for example comprise application programs, services, configurations, access to storage media, access to servers, access to communication devices, network access control applications, in particular USIM, CSIM, ISIM, NFC applications.

The subscriber identity module 112 can be implemented, for example, on an eUICC (embedded Universal Integrated Circuit Card) circuit.

In one embodiment, the processor 111 can establish a communication channel 615 over a fifth-generation (5G) network 400, 500 or a further generation network in response to the entered input of the personal identification number 114, as already described above with respect to FIG. 1.

Figure 3:
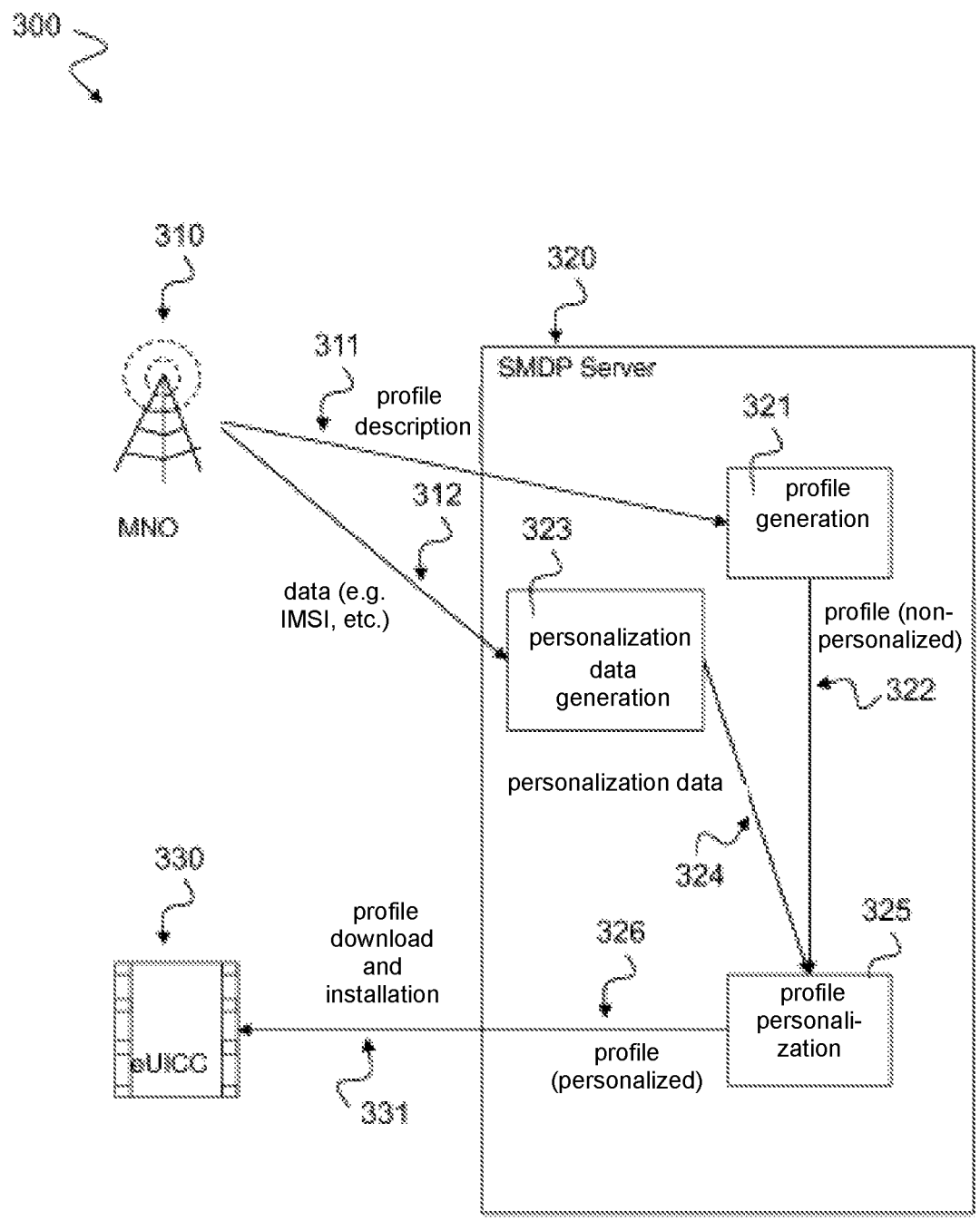
FIG. 3 is a schematic representation of a communication system 300 comprising an eUICC 330 and SMDP server 320 for providing a personalized profile 326 according to an exemplary embodiment.

FIG. 3 shows a schematic representation of a communication system 300 comprising an eUICC 330 and SMDP server 320 for providing a personalized profile 326 according to one exemplary embodiment.

The SMDP ("Subscription Manager Data Preparation") server 320; i.e. registration management and data preparation server 320, is a server which provides the SIM module or respectively the eUICC 330 with a personalized user profile 326, which can be downloaded and installed via an interface 331. The SMDP server 320 thereby receives a profile description 311 and personal data 312 such as, for example, an IMSI (International Mobile Subscriber ID) from the mobile network operator (MNO) 310 to which the respective user is subscribed or respectively registered.

The SMDP server 320 comprises a profile generation module 321 with which a (non-personalized) profile of the user can be generated from the profile description 311. The SMDP server 320 further comprise a module 323 for generating personalization data with which personalization data 324 can be generated from the personal data 312, for example network access keys, profile installation keys, registration and access data or other data. The SMDP server 320 comprises a module 325 for generating a personalized profile 326 from the non-personalized profile 322 and the personalization data 324. The personalized profile 326 The personalized profile 326 can for example be encrypted with the profile installation key of the target eUICC 330. The personalized profile 326 can then provide the eUICC 330 for download and installation in secured manner, for example by way of an SM-SR process; i.e. "Subscription Manager Secure Routing."

The SMDP server 320 can thereby manage the authentication and authorization of the eUICC entity 330. Together with the SM-SR process, the SMDP server 320 thereby ensures that electronic data transmitted to the eUICC 330 is accordingly secure. To ensure the security, user access to sensitive data such as the personalized profile 326 can thereby be excluded or limited to the absolute minimum necessary. The SMDP server 320 can, for example, document each accessing of sensitive data with an entry which includes the date, time, activity and person initiating the access. Sensitive data such as e.g. the personalized profile 326 can in addition be encrypted with cryptographic keys using cryptographic algorithms, whereby each cryptographic key management process can be documented accordingly. The SMDP server 320 can furthermore have a comprehensive software and/or security patch at its disposal for detection of and defense against recently discovered viruses and malicious software.

At the request of the MNO 310, the SMDP server 320 can also initiate the activation or respectively enabling of a profile as well as the deleting of a profile on the eUICC 330.

A profile can hereby encompass a data structure combination of data and applications which are to be provided or available on an eUICC and allow access to a specific mobile network resource when activated.

The profile description 311 can be composed of profile metadata; i.e. information on a profile such as, for example, MSISDN (Mobile Subscriber ISDN) or data for the SM-SR process for managing the eUICC 330.

The SMDP server can be implemented pursuant to an SAS ("Security Accreditation Scheme") standard. For example, the SMDP server can be implemented pursuant to the GSMA SAS standard, e.g. in Version 1.0 from Oct. 13, 2014.

Figure 4:
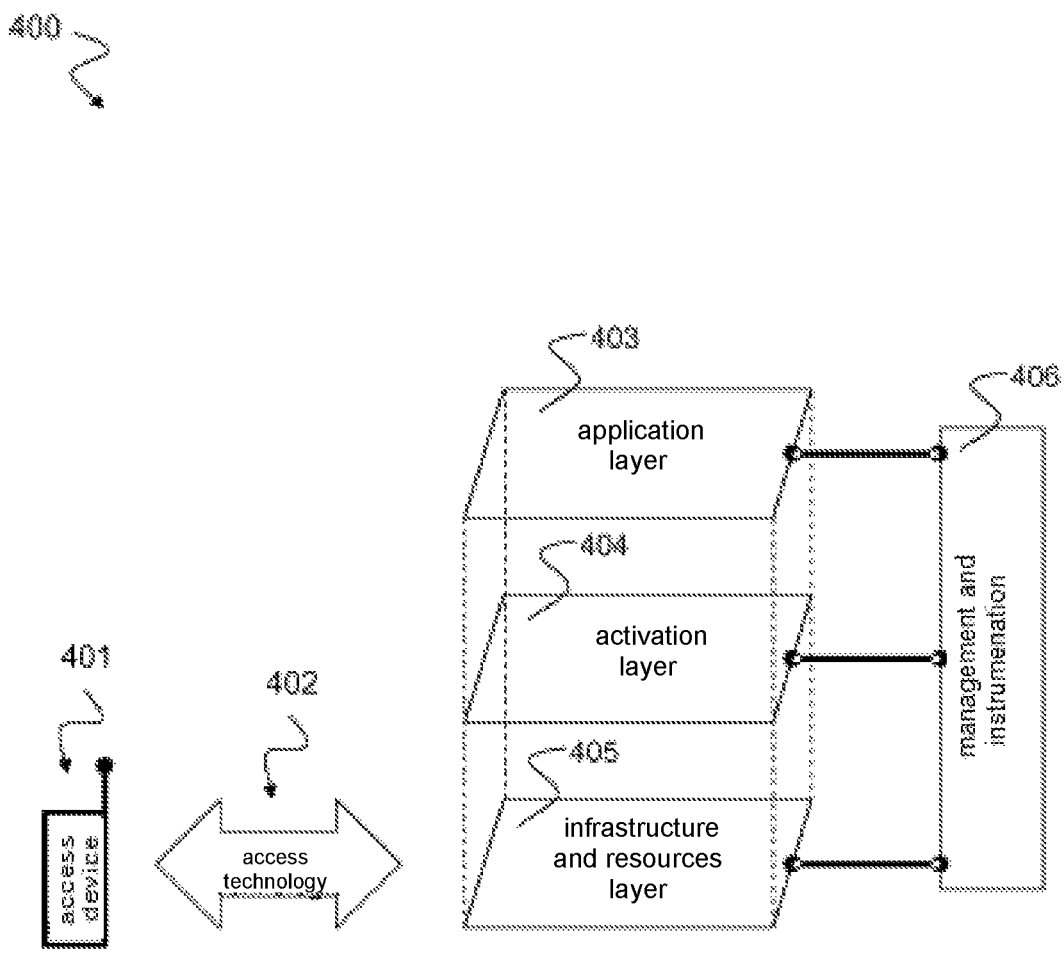
FIG. 4 is a schematic representation of a 5G system architecture 400.

FIG. 4 shows a schematic representation of a 5G system architecture 400.

The 5G system architecture 400 contains an area with 5G communication terminals 401 connected by different access technologies 402 to a multilayered communication structure comprising an infrastructure and resources layer 405, an activation layer 404 and an application layer 403 able to be managed by a management and instrumentation layer 406.

The infrastructure and resources layer 405 comprises the physical resources of a converged network structure of fixed and mobile communication network components ("Fixed-Mobile Convergence") with access nodes, cloud nodes (including processing and storage nodes), 5G devices such as e.g. cellular phones, portable devices, CPEs, machine communication modules and other network nodes and associated links. 5G devices can incorporate diverse and configurable capabilities and can act for example as a relay or a hub or, depending on the respective context, function as a computer/memory resource. These resources are made available to the higher layers 404, 403 and the management and instrumentation layer 406 via the corresponding APIs (application program interfaces). Monitoring the performance and the configurations are inherent to such APIs.

The activation layer 404 comprises a library of functions needed within a converged network in the form of blocks of a modular architecture. These include functions implemented by software modules, which can be retrieved from a storage location for the desired location, and a set of configuration parameters for specific parts of the network, e.g. the radio access. These functions and capabilities can be retrieved on demand by the management and instrumentation layer 406 utilizing the APIs provided for the purpose. There can be multiple variants of specific functions, e.g. different implementations of the same functionality which have different efficiencies or characteristics. The different degrees of efficiency and provided capabilities can thereby be used to differentiate the network functionalities to a further substantial degree than is possible in today's networks, e.g. so as to provide a mobility function of a nomadic mobility, vehicle mobility or aviation mobility depending on the specific needs.

The application layer 403 comprises specific applications and services of the network operator, the company, the vertical operator or third parties who use the 5G network. The interface to the management and instrumentation layer 406 allows certain; i.e. dedicated network slices, for example, to be established for an application or an application to be assigned to an existing network slice.

The management and instrumentation layer 406 is the contact point for implementing the requested applications (use cases, also business models) into actual network functions and slices. It defines the network slices for a given application scenario, interlinks the thereby relevant modular network functions, assigns the relevant performance configurations and maps everything to the resources of the infrastructure and resources layer 405. The management and instrumentation layer 406 also manages the scaling of the capacity of these functions as well as their geographical distribution. In certain applications, it can also have the capability of allowing third parties to generate and manage their own network slices using the APIs. Due to the numerous tasks of the management and instrumentation layer 406, this is thereby not a monolithic block of functions but rather a collection of modular functions integrating advancements achieved in other network domains such as, for example, NFV ("network function virtualization"), SDN ("software-defined networking") or SON ("self-organizing networks"). The management and instrumentation layer 106 thereby makes use of data-supported intelligence to optimize all the aspects of service configuration and provision.

With the mobile communication device 110, 210 described above with respect to FIGS. 1 and 2, which is used as access device 401, a communication channel can be established over network 400. The processor 111 can thereby establish the communication channel over the network 400 in response to the entered input of the personal identification number 114. For example, in response to the entered input of the personal identification number 114, the processor 111 can allow the configuration of a slice of the application layer 403 by transmitting a signaling message to the management and instrumentation layer 406 which contains the respective request and configuration parameters thereto. The processor 111 can, for example, enable the activation of an application from the application layer 403 of the 5G network 400 in response to the entered input of the personal identification number 114 via said signaling message to the management and instrumentation layer 406.

The 5G network 400 increases communication efficiency and in particular provides higher data throughput, lower latency, particularly high reliability, far higher connection density and a larger range of mobility, yet on the other hand also increases operational flexibility and provides customized functions with the lowest possible use of resources. This increased efficiency is accompanied by the ability to control highly heterogeneous environments and the ability to protect the trust, identity and privacy of users.

The devices, systems and methods presented here are provided for the purpose of improving the efficiency of communication in communication networks, particularly in 5G communication networks having a plurality of network slices as will be described below.

Figure 5:
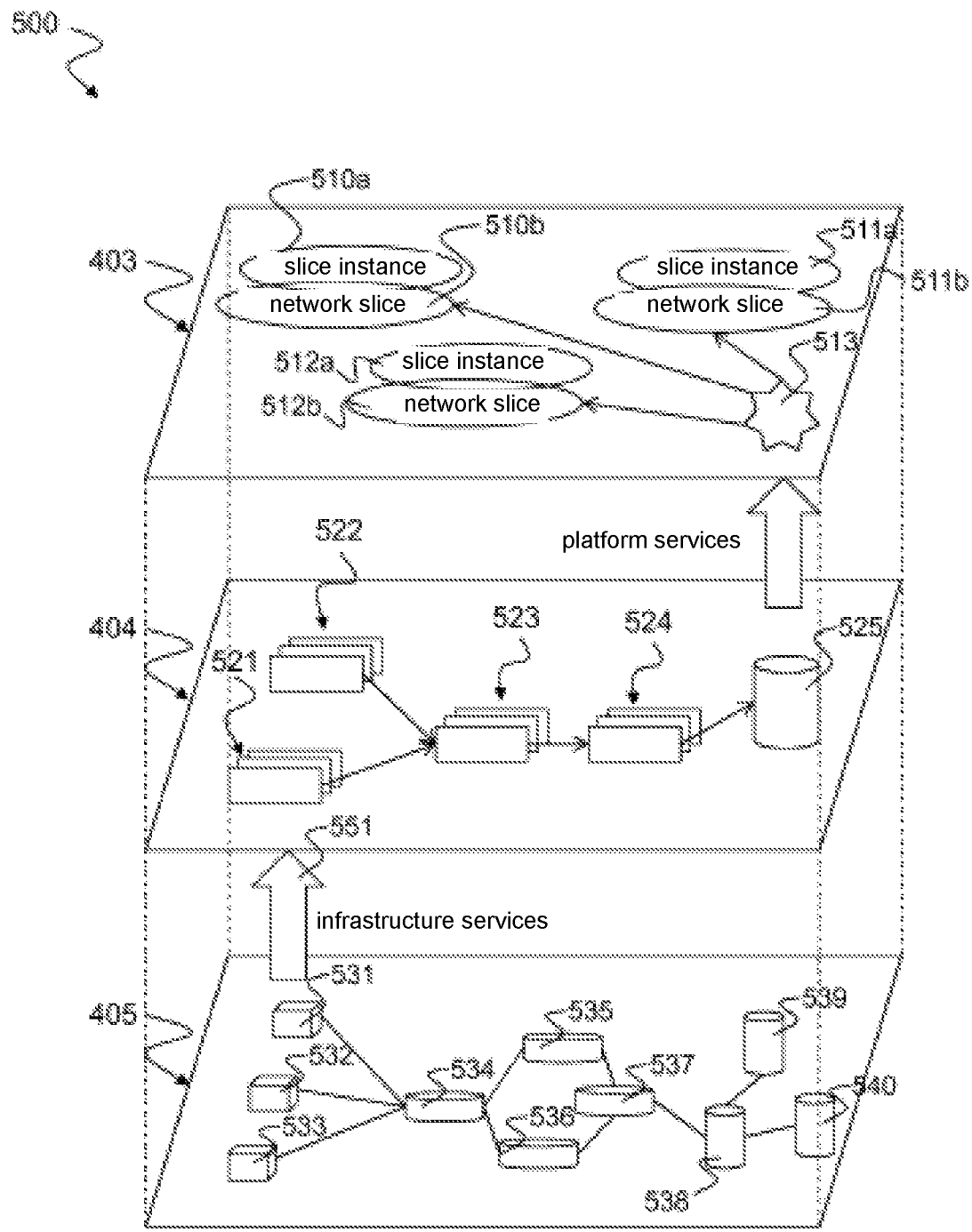
FIG. 5 is a schematic representation of a 5G communication network having a plurality of slices (network slices) 500.

FIG. 5 shows a schematic representation of a 5G communication network having a plurality of slices (network slices) 500.

The 5G communication network 500 has an infrastructure and resources layer 405, an activation layer 404 and an application layer 403 as described above with respect to FIG. 4.

The infrastructure and resources layer 405 comprises all the physical assets associated with a network operator; i.e. locations, cable, network nodes, etc. This layer 405 forms the basis for all the network slices. It is structured as generically as possible without too many specialized physical entities. The infrastructure and resources layer 405 conceals each type of user-specific implementation vis-à-vis the upper layers so that the best use can be made of the remaining systems for different slices. Components of the infrastructure and resources layer 405 are based on hardware and software/firmware required for each respective operation and thereby provided as resource objects to the higher layers as infrastructure and resources layer 405. Objects of the infrastructure and resources layer 405 for example include virtual machines, virtual links or connections and virtual networks, e.g. virtual access nodes 531, 532, 533, virtual network nodes 534, 535, 536, 537 and virtual computer nodes 538, 539, 540. As the term "virtual" itself indicates, the infrastructure and resources layer 405 provides the objects to the next higher layer 404 in the form of an "infrastructure-as-service" 551; i.e. in an abstracted virtualized form.

The activation layer 404 is disposed above the infrastructure and resources layer 405. It uses the objects of the infrastructure and resources layer 405 and adds additional functionality to same in the form of (e.g. non-physical) software objects/VNFs in order to enable any type of network slice to be generated and thus provide the next-higher layer 403 a platform as a service.

Software objects can be of any granularity and encompass a tiny or a very large fragment of a network slice. In order to enable the generating of network slices at a suitable extraction level, different abstracted objects 521 can be combined with other abstracted objects and with virtual network functions 522 in the activation layer 404 in order to form combined objects 523 which can be converted into aggregated objects 524 and furnished to the next-higher level in an object library 525. The complexity can thus be hidden behind the network slices. For example, a user can create a mobile broadband slice and thereby only define the KPI (Key Performance Indicator) without thereby needing to specify specific features such as individual local antenna coverage, backhaul links or specific degrees of parameterization. In order to support an open environment and allow network functions to be added or deleted on demand, an important capability of the activation layer 404 is that it supports the dynamic rearrangement of functions and connectivities in a network slice, e.g. through the use of SFC ("Service Function Chaining") or modifying software so that the functionality of a slice can be fully predefined and both largely static software modules as well as dynamically addable software modules can be incorporated.

A network slice can thereby be regarded as a software-defined entity based on a set of objects which define a complete network. The activation layer 404 plays a key role for the success of this concept as it can comprise all the software objects necessary to provide the network slices and the respective capabilities to manage the objects. The activation layer 404 can be regarded as a type of network operating system complemented by a network generating environment. One task of the activation layer 404 is the defining of the respective abstraction levels. Network operators thus have ample leeway in designing their network slices while platform operators can still maintain and optimize the physical nodes. For example, the execution of everyday tasks such as adding or replacing nodeBs, etc., without the intervention of the network clients is thus supported. The definition of suitable objects which model a complete telecommunications network is one of the tasks of the activation layer 104 during the development of the network slice environment.

A network slice, also referred to as a 5G slice, supports the communication services of a specific connection type having a specific type of management of the C (Control) and the U (User Data) layer. A 5G slice is composed of a collection of different 5G network functions and specific radio access technology (RAT) settings which are combined for the benefit of the specific application or use case respectively. A 5G slice can therefore span all domains of the network, e.g. software modules running on cloud nodes, specific configurations of the transport network supporting flexible function location, a specific radio configuration or even a specific access technology just as well as a configuration of the 5G devices. Not all of the slices contain the same functions, some functions which today seem essential to a mobile network may not even be included in some slices. The intention of the 5G slice is that of only providing the functions necessary for the specific use case and eschewing all other unnecessary functionalities. The flexibility behind the slice concept is the key to both expanding existing use cases as well as also generating new use cases. Third party devices can thus be granted suitable API permission to control specific slicing aspects so as to be able to provide customized services.

The application layer 403 comprises all the generated network slices 510b, 511b, 512b and provides these as "network-as-service" to different network users, e.g. different clients. The concept allows for the reuse of defined network slices 510b, 511b, 512b for different users, e.g. clients, for example as a new network slice instance 510a, 511a, 512a. That means that a network slice 510b, 511b, 512b which is for example associated with an automotive application, can also be used for applications in other different industrial applications. The slice instances 510a, 511a, 512a generated by a first user can for example be independent of the slice instances generated by a second user, and that even though the entire network slice functionality may be the same.

With the mobile communication device 110, 210 described above with respect to FIGS. 1 and 2, a communication channel can be established over network 500. The processor 111 can to that end establish the communication channel via the network 500 in response to the entered input of the personal identification number 114.

The processor 111 can for example have a network slice 510b, 511b, 512b or a respective slice instance 510a, 511a, 512a of the application layer 403 be configured in response to the entered input of the personal identification number 114 by transmitting a signaling message comprising the corresponding request and configuration parameters thereto to the management and instrumentation layer 406 described with respect to FIG. 4. For example, in response to the entered input of the personal identification number 114, the processor 111 can allow activation of an application from the application layer 403 of the 5G network 400, e.g. a network slice 510b, 511b, 512b or a respective slice instance 510a, 511a, 512a of the application layer 403, via said signaling message to the management and instrumentation layer 406.

Figure 6:
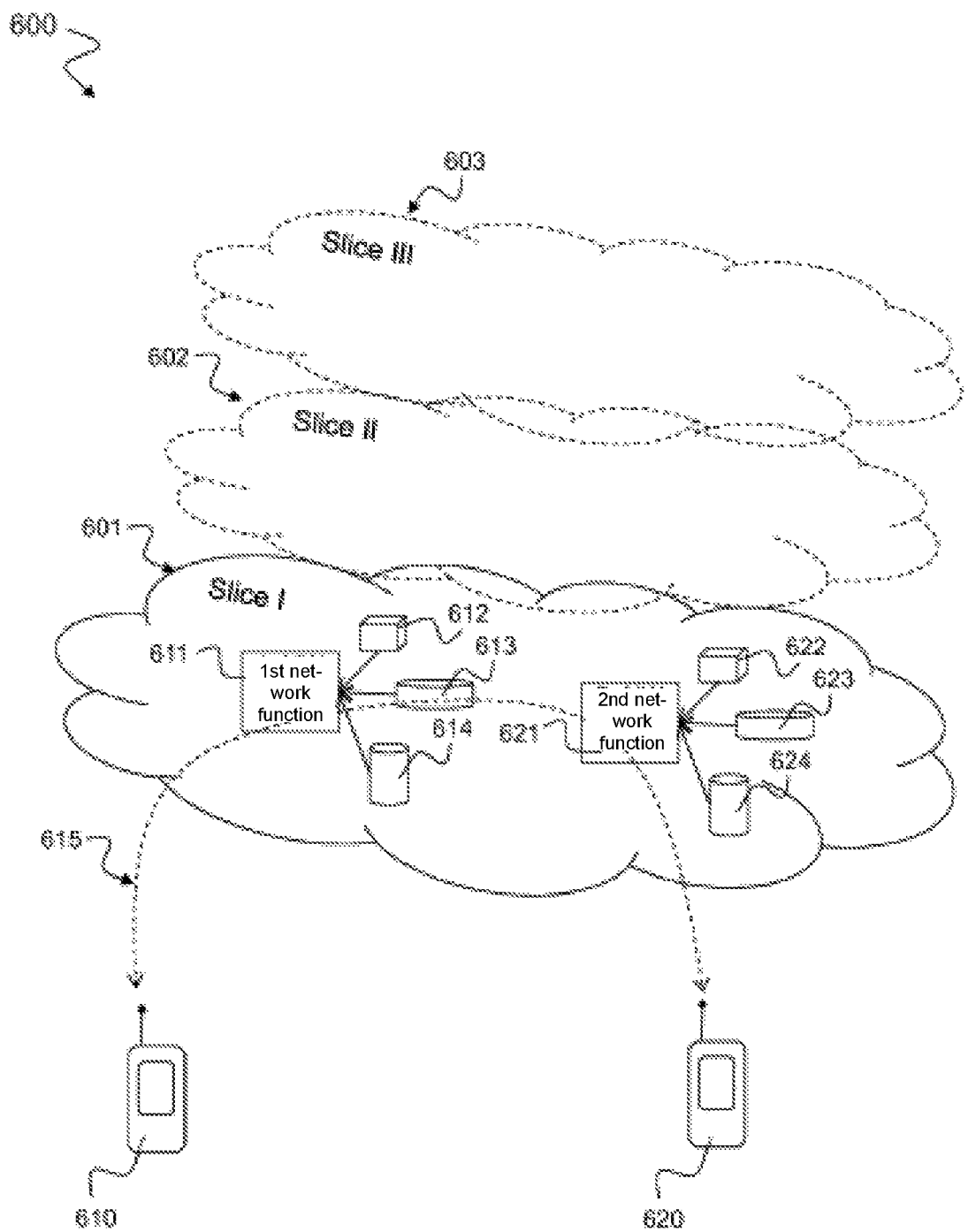
FIG. 6 is a schematic representation of a 5G communication network 600 having a communication channel 615 for communicating between two mobile communication devices according to an exemplary embodiment.

FIG. 6 shows a schematic representation of a 5G communication network 600 having a communication channel 615 for communication between two mobile communication devices according to one exemplary embodiment.

The communication device 610 can establish a communication channel 615 over the network 600, for example to a second communication device 620. The communication device 610 can correspond to the mobile communication device 110, 210 described above with respect to FIGS. 1 and 2. To initiate the communication channel 615, the processor 111 can, in response to the entered input of the personal identification number 114, establish the communication channel 615 over the network 600, for example via a first subnet 601 or respectively slice I of the communication network 600. For example, in response to the entered input of the personal identification number 114, the processor 111 can allow the configuration of the network slice 601 by transmitting a signaling message comprising the corresponding request and configuration parameters thereto to the management and instrumentation layer 406 described with respect to FIG. 4. This can, for example, configure a first network function 611 and a second network function 621 in the slice 601 which then allocate the necessary resources 612, 613, 614, 622, 623, 624 for establishing the communication channel 615. For example, in response to the entered input of the personal identification number 114, the processor 111 can allow activation of an application from the application layer 403 of the 5G network 400, e.g. the network slice 601 or the network functions 611, 621 for allocating the network resources 612, 613, 614, 622, 623, 624 required to establish the communication channel 615, via said signaling message to the management and instrumentation layer 406.

Figure 7:
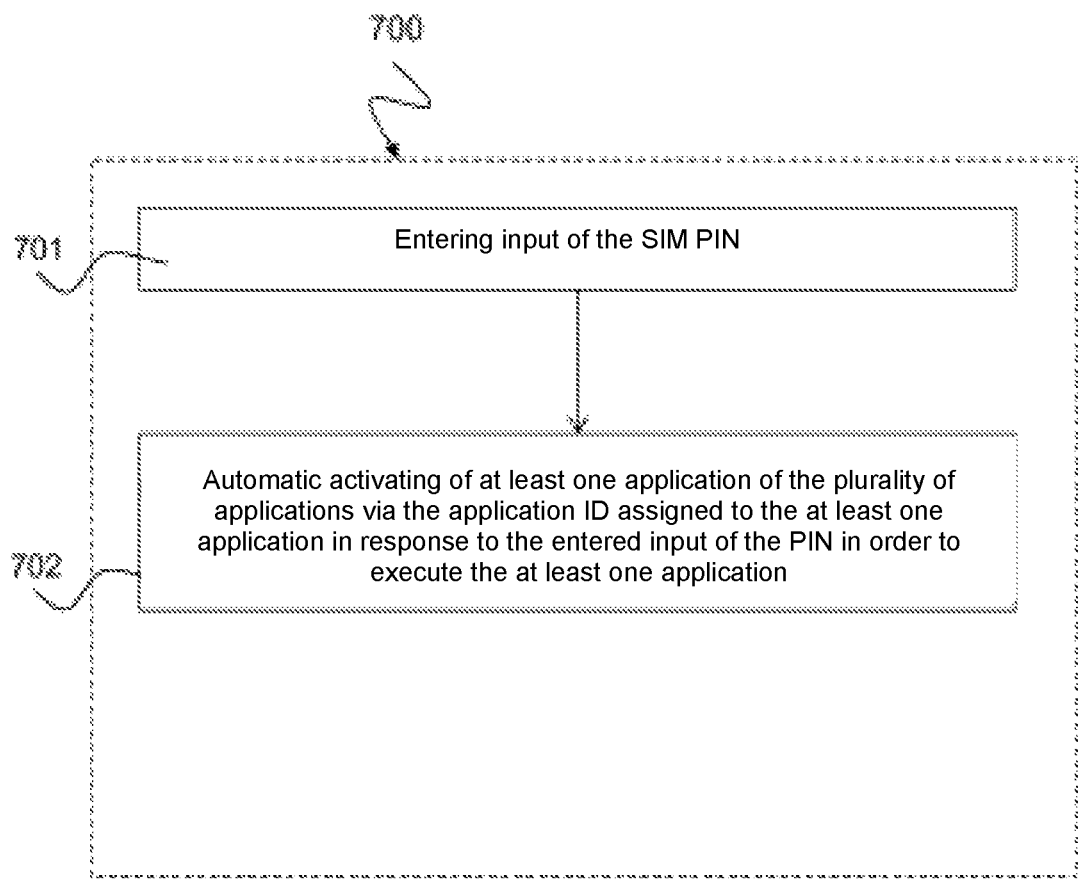
FIG. 7 is a schematic representation of a method 700 according to one exemplary embodiment for activating at least one application on a mobile communication device on which a plurality of applications are executable.

FIG. 7 shows a schematic representation of a method 700 according to one exemplary embodiment for activating at least one application on a mobile communication device on which a plurality of applications can be executed.

Each application can thereby be activated via an application identification number and the communication device comprises a subscriber identity module (SIM) assigned a personal identification number (PIN) as described above with respect to FIGS. 1 and 2.

The method comprises a first step 701: Entering an input of the personal identification number of the subscriber identity module, for example via a user interface 113 as described above with respect to FIGS. 1 and 2.

The method 700 comprises a second step 702: Automatically activating at least one application of the plurality of applications via the application identification number assigned to the at least one application in response to the entered input of the personal identification number in order to execute the at least one application, e.g. via a processor 111 as described above with respect to FIGS. 1 and 2.

The method 700 can for example be used in a communication network or communication system 100, 200, 300, 400, 500, 600, as described with respect to FIGS. 1 to 6, in particular on a mobile communication device 110, 210, 401, 610, 620 as described with respect to FIGS. 1, 2, 4 and 6 or on an eUICC 330 as described above with respect to FIG. 3. The method can further comprise additional steps with which the functions described above with respect to FIGS. 1 to 6 can be implemented on the cited devices.

One aspect of the invention also encompasses a computer program product which can be loaded directly into the internal memory of a digital computer and comprises portions of software code with which the method 700 described with respect to FIG. 7 or the processes described with respect to FIGS. 1 to 6 can be executed when the program is run on a computer. The computer program product can be stored on a computer-suited non-transitory medium and comprise computer-readable software which prompts a computer to execute the method 700 or to implement or respectively control the network components of the communication network described with respect to FIGS. 1 to 6.

The computer can be a PC, e.g. a PC of a computer network. The computer can be implemented as a chip, an ASIC, a microprocessor or a signal processor and can be disposed in a computer network, for example a communication network as described with respect to FIGS. 1 to 6.

It is apparent that unless specifically stated otherwise, the features of the various exemplary embodiments described herein can be combined with one another. As described in the description and illustrated in the drawings, individual elements depicted as connected do not need to be directly connected; intermediate elements can be provided between the connected elements. It is further apparent that embodiments of the invention can be implemented in individual circuits, partially integrated circuits or fully integrated circuits or software. The term "for example" only refers to an example and not to the best or optimum. Specific embodiments have been illustrated and described herein, yet it is apparent to one skilled in the art that a plurality of alternative and/or similar implementations may be implemented in place of the shown and described embodiments without departing from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100: communication system
110: mobile communication device according to a first embodiment
111: processor
112: subscriber identity module with personal identification number (SIM-PIN)
113: user interface
114: SIM-PIN input
115: user
121: first application
122: second application
123: third application
124: fourth application
131: first application ID
132: second application ID
133: third application ID
134: fourth application ID
141: first slice/first subnet
142: second slice/second subnet
200 communication system
210: mobile communication device according to a second embodiment
216: memory
217: management interface
250: SMDP server 300: communication system
310: MNO/mobile network operator
311: profile description
312: personal data, e.g. IMSI, etc.
320: SMDP server
321: profile generation
322: profile, non-personalized
323: personalization data generation
324: personalization data
325: profile personalization
326: personalized profile
330: eUICC
331: profile download and installation
400: 5G system architecture
401: access device, communication terminal, UE
402: access technology
403: application level
404: activation level
405: infrastructure and resources level
406: management and instrumentation level
500: 5G communication network with multiple slices
510a: first slice instance
510b: first network slice
511a: second slice instance
511b: second network slice
512a: third slice instance
512b: third network slice
513: slice composition
521: abstracted objects
522: virtual network functions
523: combined objects
524: aggregated objects
525: object library
531: access nodes
532: access nodes
533: access nodes
534: virtual network nodes
535: virtual network nodes
536: virtual network nodes
537: virtual network nodes
538: computer nodes
539: computer nodes
540: computer nodes
551: infrastructure services
600: communication network/communication system
601: first subnet/slice I or single subnet
602: second subnet/slice II
603: third subnet/slice III
610: first mobile communication device
611: first communication entity with first network function
612, 613, 614: network components assigned to the first communication entity via the first network function
620: second mobile communication device
621: second communication entity with second network function
622, 623, 624: network components assigned to the second communication entity via the second network function
700: method for activating an application on a mobile communication device
701: first step: entering the PIN input
702: second step: automatic activating of at least one application

The invention claimed is:

1. A mobile communication device for executing a plurality of applications, wherein each application of the plurality of applications is configured to be activated via a respective application identification number, wherein the mobile communication device comprises:
  a subscriber identity module, which is assigned a personal identification number;
  a user interface for receiving a user input of the personal identification number of the subscriber identity module; and
  a processor, configured to automatically activate at least one application of the plurality of applications via at least one respective application identification number assigned to the at least one application in response to the user input of the personal identification number of the subscriber identity module;
  wherein each application of the plurality of applications has its own secondary personal identification number via which it can be activated; and
  wherein the personal identification number of the subscriber identity module is a master personal identification number able to activate all the secondary personal identification numbers.

2. The mobile communication device according to claim 1, wherein the processor is configured to transmit the at least one respective application identification number to the at least one application in order to activate the at least one application.

3. The mobile communication device according to claim 1, wherein the processor is configured to launch the plurality of applications and activate the launched applications via the personal identification number of the subscriber identity module.

4. The mobile communication device according to claim 1, further comprising:
  a memory, configured to store the application identification numbers of the plurality of applications;
  wherein the processor is further configured to read out the application identification numbers from the memory for the activation of the applications.

5. The mobile communication device according to claim 1, further comprising:
  a management interface, configured to receive the personal identification number of the subscriber identity module from a Subscription Manager Data Preparation (SMDP) server of a network operator.

6. The mobile communication device according to claim 5, wherein the management interface is configured to store the received personal identification number of the subscriber identity module in an encrypted area of the mobile communication device bypassing the processor.

7. The mobile communication device according to claim 1, wherein the plurality of applications correspond to: application programs, services, configurations, access to storage media, access to servers, access to communication devices, and/or network access control applications.

8. The mobile communication device according to claim 1, wherein the subscriber identity module is implemented on an embedded Universal Integrated Circuit Card (eUICC) circuit on which the subscriber identity module is implemented.

9. The mobile communication device according to claim 1, wherein the processor is further configured to establish a communication channel over a fifth-generation (5G) network or further generation network in response to the user input of the personal identification number of the subscriber identity module.

10. The mobile communication device according to claim 9, wherein the processor is further configured to configure or allow configuration of a slice of the 5G network or further generation network in response to the user input of the personal identification number of the subscriber identity module.

11. The mobile communication device according to claim 9, wherein the processor is further configured to activate or allow activation of an application of the 5G network or further generation network in response to the user input of the personal identification number of the subscriber identity module.

12. A method for activating at least one application on a mobile communication device configured to execute a plurality of applications, wherein each application of the plurality of applications is configured to be activated by a respective application identification number, wherein the mobile communication device comprises a subscriber identity module which is assigned a personal identification number, the method comprising:

receiving, by the mobile communication device, a user input of the personal identification number of the subscriber identity module; and automatically activating, by the mobile communication device, the at least one application of the plurality of applications via at least one respective application identification number assigned to the at least one application in response to the user input of the personal identification number of the subscriber identity module;

wherein each application of the plurality of applications has its own secondary personal identification number via which it can be activated; and wherein the personal identification number of the subscriber identity module is a master personal identification number able to activate all the secondary personal identification numbers.

* * * * *